US011616366B2

(12) United States Patent
Vanevenhoven et al.

(10) Patent No.: US 11,616,366 B2
(45) Date of Patent: Mar. 28, 2023

(54) AC ESSENTIAL BUS DELTA CURRENT AND OVER CURRENT PROTECTION SCHEME

(71) Applicant: Hamilton Sundstrand Corporation, Charlotte, NC (US)

(72) Inventors: Jordan K. Vanevenhoven, Rockford, IL (US); Jeffrey D. Myroth, Roscoe, IL (US); Jef William Good, German Valley, IL (US); Shane R. Traser, Rockford, IL (US); John N. Buzzard, Rockford, IL (US); Kyle Ives, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 41 days.

(21) Appl. No.: 16/817,206

(22) Filed: Mar. 12, 2020

(65) Prior Publication Data

US 2021/0288498 A1 Sep. 16, 2021

(51) Int. Cl.
*H02J 3/14* (2006.01)
*H02J 3/38* (2006.01)
(Continued)

(52) U.S. Cl.
CPC .............. *H02J 3/144* (2020.01); *H02J 3/381* (2013.01); *H04L 12/40* (2013.01); *B64D 41/007* (2013.01)

(58) Field of Classification Search
CPC ............ H02J 3/144; H02J 3/381; H04L 12/40
See application file for complete search history.

(56) References Cited

U.S. PATENT DOCUMENTS 5,729,059 A * 3/1998 Kilroy ................. H02J 3/42
307/64
9,050,897 B1 * 6/2015 Collins ................. B60L 1/006
(Continued)

FOREIGN PATENT DOCUMENTS

| EP | 2536000 A2 | 12/2012 |
| EP | 3101750 A1 | 12/2016 |
| EP | 3333401 A1 | 6/2018 |

OTHER PUBLICATIONS

"Joe Mulqueen, Switch Circuits and Functions, Digi-Key, https://forum.digikey.com/t/switch-circuits-and-functions/74, p. 2" (Year: 2017).*

(Continued)

*Primary Examiner* — Santosh R Poudel
(74) *Attorney, Agent, or Firm* — Locke Lord LLP; Joshua L. Jones; Gabrielle L. Gelozin

(57) ABSTRACT

A system includes a first AC bus configured to supply power from a first generator. A second AC bus is configured to supply power from a second generator. An AC essential bus tie contactor (AETC) selectively connects between an AC essential bus and the first and second AC busses. An AETC controller is connected to switch the AETC between a first state connecting the AC essential bus to the first AC bus and a second state connecting the AC essential bus to the second AC bus. A sensor system is configured to detect at least one of delta current and overcurrent in the AC essential bus and in at least one of the first AC bus and the second AC bus. The sensor system is operatively connected to the AETC controller for switching the AETC between the first state and the second state based on input from the sensor system.

11 Claims, 3 Drawing Sheets

(51) Int. Cl.
*H04L 12/40* (2006.01)
*B64D 41/00* (2006.01)

(56) References Cited

U.S. PATENT DOCUMENTS

| | | | |
|---|---|---|---|
| 9,083,201 B2 | 7/2015 | Bauer et al. | |
| 9,789,973 B2 | 10/2017 | Swearingen et al. | |
| 10,530,153 B2 | 1/2020 | Huang | |
| 2010/0288326 A1* | 11/2010 | Schroeder | H02M 7/53875 136/206 |
| 2011/0163603 A1* | 7/2011 | Chou | H02J 7/35 307/66 |
| 2014/0008488 A1* | 1/2014 | Buzzard | B64D 41/00 244/50 |
| 2015/0103457 A1* | 4/2015 | Shander | H02J 3/381 361/88 |
| 2015/0311749 A1* | 10/2015 | Frampton | H02J 3/381 307/65 |
| 2016/0107588 A1* | 4/2016 | White | H02J 3/06 307/9.1 |
| 2017/0358946 A1* | 12/2017 | Bonachea | H02H 3/207 |
| 2018/0339790 A1 | 11/2018 | Huang | |
| 2019/0291888 A1 | 9/2019 | Larson, Jr. et al. | |

OTHER PUBLICATIONS

Extended European Search Report dated Jul. 14, 2021, issued during the prosecution of European Patent Application No. EP 21162321.0.

* cited by examiner

AC ESSENTIAL BUS DELTA CURRENT AND OVER CURRENT PROTECTION SCHEME

BACKGROUND

1. Field

The present disclosure relates to power distribution systems, and more particularly to AC essential busses such as used in aerospace applications.

2. Description of Related Art

An architecture for a two channel system includes two AC buses, each fed by its own generator channel. A third AC bus, the AC essential bus, can be fed from either of the two normal buses, or in an emergency condition, from a ram air turbine (RAT) generator. The AC essential bus tie contactor (AETC) is sometimes implemented with a single contactor (single pole-double throw), or multiple contactors (multi pole-multi throw) that switches between AC bus 1 and AC bus 2 based on bus availability, so the AC essential bus cannot be isolated. Also the AETC controller does not have direct sense information on the AC essential bus currents.

The conventional techniques have been considered satisfactory for their intended purpose. However, there is an ever present need for improved systems and methods for power distribution. This disclosure provides a solution for this need.

SUMMARY

A system includes a first AC bus configured to supply power from a first generator. A second AC bus is configured to supply power from a second generator. An AC essential bus tie contactor (AETC) selectively connects between an AC essential bus and the first and second AC busses. An AETC controller is connected to switch the AETC between a first state connecting the AC essential bus to the first AC bus and a second state connecting the AC essential bus to the second AC bus. A sensor system is configured to detect at least one of delta current and overcurrent in the AC essential bus and in at least one of the first AC bus and the second AC bus. The sensor system is operatively connected to the AETC controller, wherein the AETC controller is configured to switch the AETC between the first state and the second state based on input from the sensor system.

The system can include a first contactor that is connected to isolate the first AC bus from a generator. The system can include a second contactor that is connected to isolate the second AC bus from a generator. A third contactor can connect directly between the first and second AC buses for selectively isolating the first and second AC buses from each other. The system can include a first generator selectively connected to the first AC bus by the first contactor, and a second generator selectively connected to the second AC bus by the second contactor.

The AETC can include a multi- or single phase, single pole, double throw contactor. It is also contemplated that the AETC can include a multi-pole multi-throw contactor, wherein at least one additional AC bus is connected to the AETC, such as a generator and or a non-generator power source.

The AETC controller can be configured to switch the AETC between the second state and the first state based on input from the sensor system. The AETC controller can be configured to use the first AC bus as a preferred bus for powering the AC essential bus so the AETC is in the first state by default until there is a delta and/or over current in one or more of the AC essential bus and/or the first AC bus.

A ram air turbine (RAT) line contactor can connect between the AETC and the AC essential bus to selectively connect a RAT to the AC essential bus. The AETC controller can be operatively connected to the RAT line contactor to connect the RAT to the AC essential bus based on at least one of delta and overcurrent in the AC essential bus and/or in the first and second AC buses.

A method of distributing power includes supplying power from a first AC bus to an AC essential bus through an AC essential bus tie contactor (AETC). The method includes detecting at least one of delta current and/or overcurrent in the AC essential bus and switching the AETC to disconnect the AC essential bus from the first AC bus and to connect the AC essential bus to a second AC bus. The method includes detecting at least one of delta current and/or overcurrent in the second AC bus and switching a contactor to isolate the AC essential bus from the second AC bus.

The method can include refraining from deploying a ram air turbine (RAT) with delta current and/or over current in the AC essential bus. The method can include keeping the AC essential bus connected to the first AC bus as a preferred bus whenever there is not a delta current or over current detected in the first AC bus.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
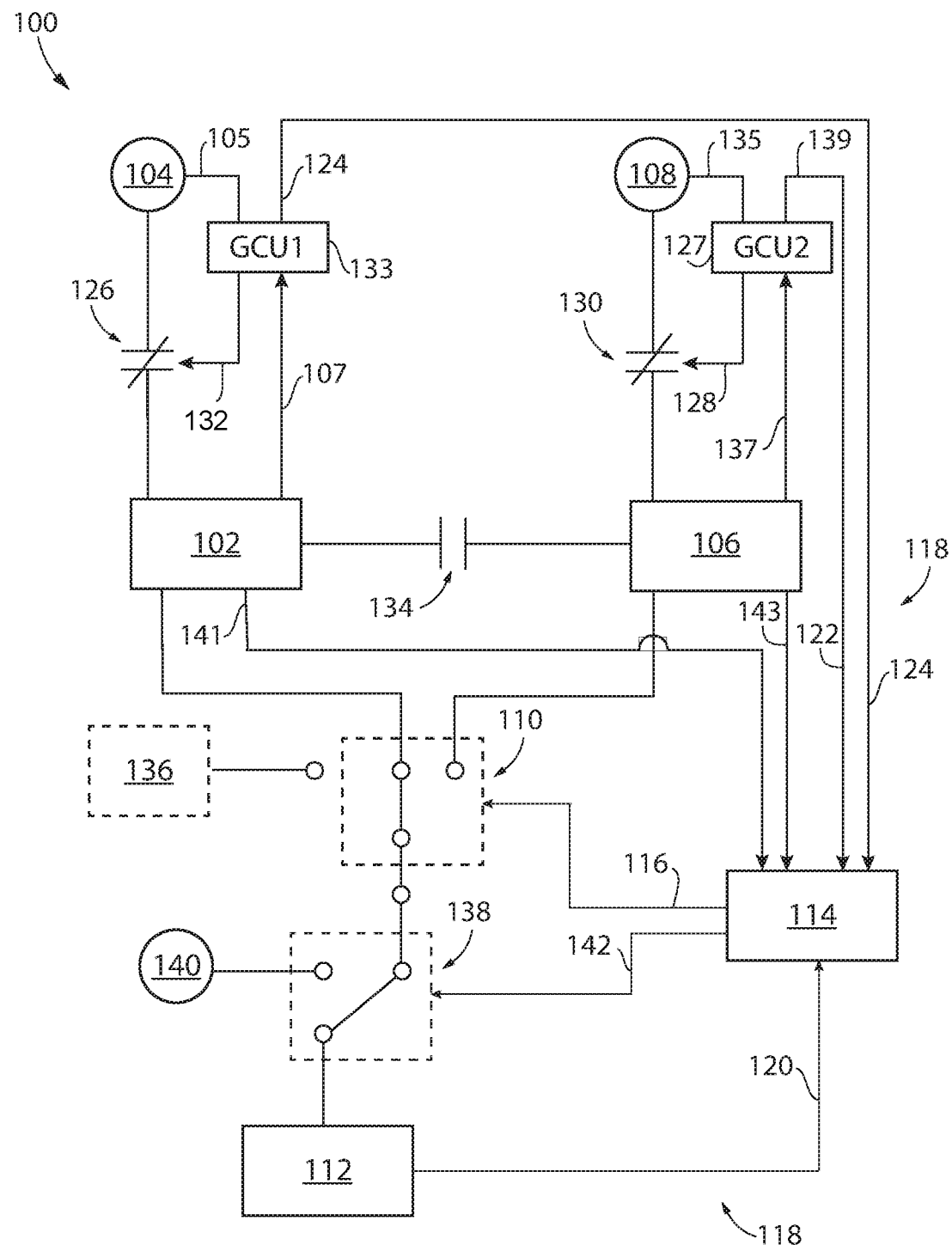
FIG. 1 is a schematic view of an embodiment of a system constructed in accordance with the present disclosure, showing the AC essential bus tie contactor (AETC) in a first state powering the AC essential bus.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used for supplying power to an AC essential bus such that the AC essential bus can be isolated. This can prevent delta current or overcurrent of the AC essential bus cascading to cause loss of other buses, e.g.

where a three-phase single pole double or multiple throw contact is used between sources, such as in aerospace applications. Overcurrent can include a significant imbalance between phases such that power quality would be affected (i.e. voltage imbalance resulting in under voltage on a given phase). This could be due to an open phase in an electrical machine or some other asymmetric fault or loading condition.

The system 100 includes a first AC bus 102 configured to supply power from a first generator 104. A second AC bus 106 is configured to supply power from a second generator 108. An AC essential bus tie contactor (AETC) 110 selectively connects between an AC essential bus 112 and the first and second AC busses 102, 106. An AETC controller 114 is connected to switch the AETC 110 between a first state connecting the AC essential bus 112 to the first AC bus 102 and a second state connecting the AC essential bus 112 to the second AC bus 106. The connection between the AETC controller 114 and the AETC 110 is indicated schematically in FIG. 1 by line 116. A sensor system 118 is configured to detect at least one of delta current and overcurrent in the AC essential bus 112 and in at least one of the first AC bus 102 and the second AC bus 106. The sensor system 118 is operatively connected to the AETC controller 114 (as indicated schematically in FIG. 1 by lines 120, 122, 124, although systems and methods herein include the case where line 120 is not available), wherein the AETC controller 114 is configured (e.g. with hardware and/or software logic) to switch the AETC 110 between the first state and the second state based on input from the sensor system 118. It is contemplated that the AETC controller 114 can make decisions to move the AETC 110 based on availability of information from line 120 (meaning it exists as an input to the AETC controller 114), or also based only on input from lines 122 and 124 (delta or overcurrent sense of the generators 104 and 108).

The system 100 includes a first contactor 126 that is connected by line 132 to be controlled by generator control unit (GCU) 127 to selectively isolate the first AC bus 102 from the first generator 104. The system also includes a second contactor 130 that is connected by line 128 to be controlled by the GCU 133 to selectively isolate the second AC bus 106 from the second generator 108. A third contactor 134 can selectively connect (or disconnect) directly between the first and second AC buses 102, 106 for selectively isolating the first and second AC buses 102, 106 from each other.

GCU 133 controls the contactor 126 using line 132, and is connected to sense current and bus 102 voltage values of the generator 104 via lines 105 and 107 as inputs from the generator and bus 102, respectively. Line 124 is used as an output from GCU 133 and an input to the AETC controller 114 to indicate the delta or over current condition to the AETC controller 114. The GCU 127 has similar sensing and controlling using lines 135, 137, 139, and 128 to lines 105, 107, 139 respectively, connecting the generator 108, the contactor 106, and the AETC controller 114.

Optionally, voltage sense lines 141 and 143 can be included in support of an additional functionality. Bus voltage of buses 102 and 106 can be used as input indicative of for bus availability using lines 141 and 143, and/or bus voltages can be communicated to the AETC controller 114 via lines 124 and 139. For the case where current sense from bus 112 is available via line 120, the AETC controller 114 can use sense lines 141 and 143 with input from essential bus 112 to switch to the dead bus (102 or 106) in the event of delta or over current.

The AETC 110 can include a multi-phase single pole, double throw contactor. It is also contemplated that the AETC 110 can include a multi-pole multi-throw contactor, wherein at least one additional AC bus 136 is connected to the AETC 110, such as a generator and or a non-generator power source.

The AETC controller 114 can be configured to use the first AC bus 102 as a preferred bus for powering the AC essential bus 112 so the AETC 110 is in the first state, shown in FIG. 1, by default until there is a delta and/or over current in one or more of the AC essential bus 112 and/or the first AC bus 102. It is also contemplated that the second bus 106 can be preferred, or the system 100 need not have either bus 102, 106 be preferred.

A ram air turbine (RAT) line contactor 138 can connect between the AETC 110 and the AC essential bus 112 to selectively connect a RAT 140 to the AC essential bus 112. The AETC controller 114 can be operatively connected to the RAT line contactor 138, e.g. by line 142, to connect the RAT 140 to the AC essential bus 112 based on at least one of delta current and overcurrent in the AC essential bus 112 and/or in the first and second AC buses 102, 106.

Figure 2:
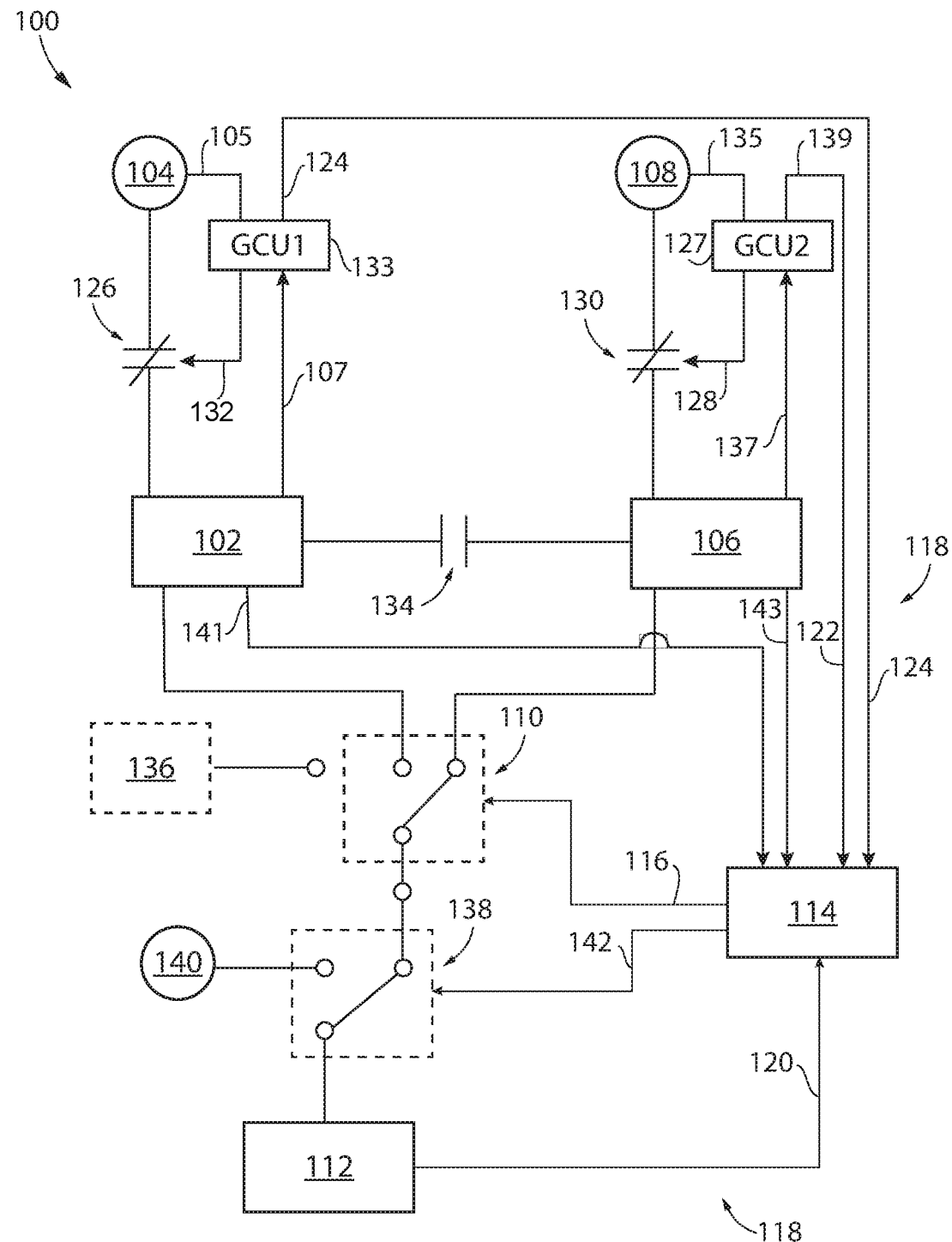
FIG. 2 is a schematic view of the system of FIG. 1, showing the AETC in a second state isolating the AC essential bus.
Figure 3:
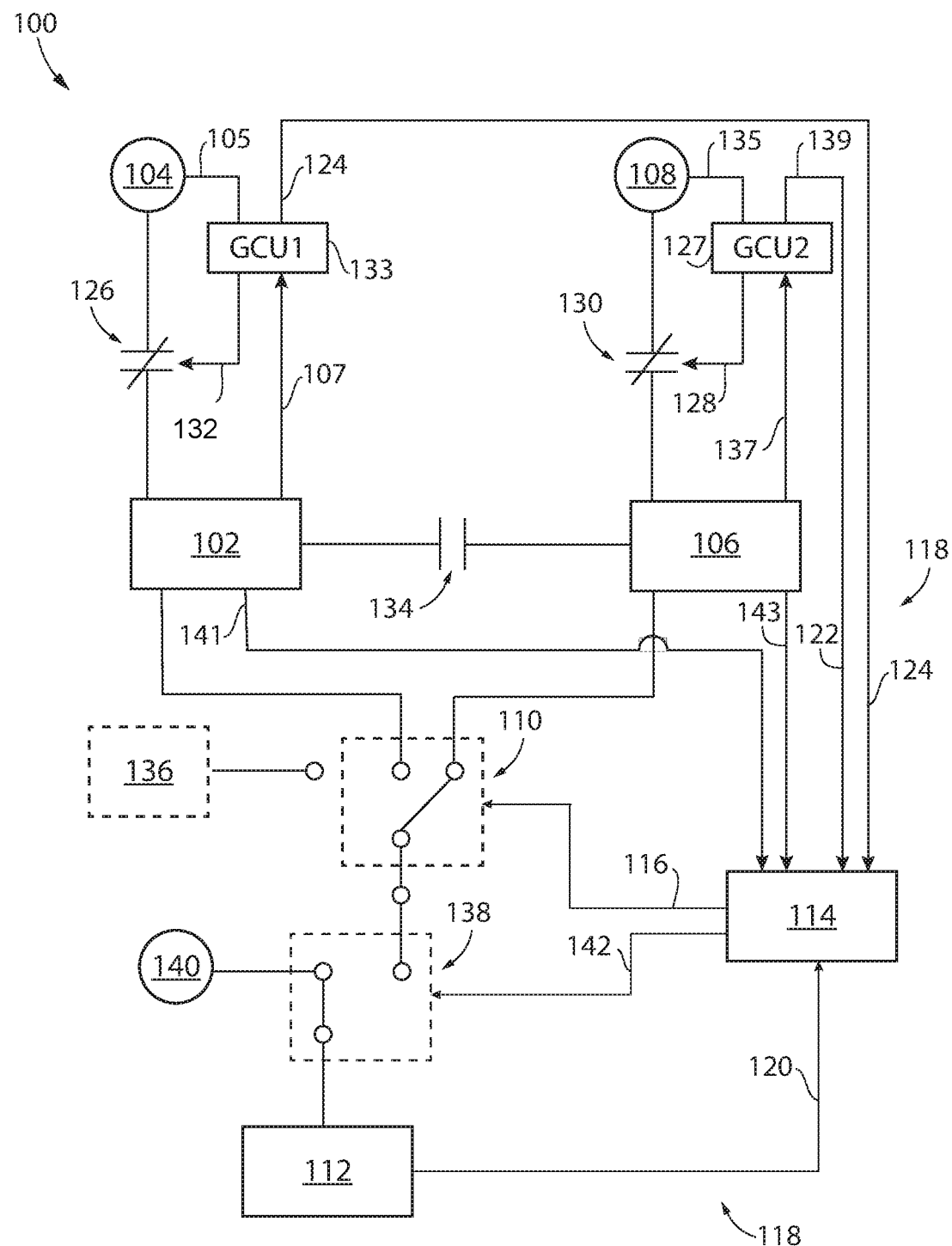
FIG. 3 is a schematic view of the system of FIG. 1, showing a state where a ram air turbine (RAT) powers the AC essential bus.

A method of distributing power includes supplying power from a first AC bus 102 to an AC essential bus 112 through an AETC 110, as show in FIG. 1. The method includes detecting at least one of delta current and/or overcurrent in the AC essential bus 112, e.g. with a signal from sensor system 118 and/or along line 120, and switching the AETC 110 to disconnect the AC essential bus 112 from the first AC bus 102, which connects the AC essential bus 112 to the second AC bus 106 as shown in FIG. 2. The method includes detecting at least one of delta current and/or overcurrent in the second AC bus 106 and switching a contactor 130 to isolate the AC essential bus 112 from the second AC bus 106 as shown in FIG. 2, to allow the bus 102 to be powered normally. This can allow the system 100 to refrain from deploying the RAT 140 in situations with delta current and/or over current in the AC essential bus 112 where the RAT 140 is not needed. The method can optionally include keeping the AC essential bus 112 connected to the first AC bus 102 (or instead second bus 106) as a preferred bus whenever there is not a delta current or over current detected in the first AC bus. As shown in FIG. 3, the AETC controller can optionally to connect the RAT 140 to the AC essential bus 112 based on at least one of delta current and overcurrent in the AC essential bus 112 and/or in the first and second AC buses 102, 106 to allow isolation of AC essential bus 112 while both busses 102 and 106 remain powered. The RAT 140 is not required, but can optionally be included.

The methods and systems of the present disclosure, as described above and shown in the drawings, provide for supplying power to an AC essential bus such that the AC essential bus can be isolated, preventing delta current or overcurrent of the AC essential bus cascading to cause loss of other buses, e.g. where a multi-phase single pole double or multiple throw contact is used between sources. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a first AC bus configured to supply power from a first generator;
   a second AC bus configured to supply power from a second generator;

an AC essential bus tie contactor (AETC) selectively connecting between an AC essential bus and the first and second AC busses;

a sensor system configured to detect at least one of delta current and overcurrent in the AC essential bus and/or in at least one of the first AC bus and the second AC bus;

an AETC controller in operable communication with the sensor system configured to switch the AETC between a first state connecting the AC essential bus to the first AC bus and a second state connecting the AC essential bus to the second AC bus based on input from the sensor system; and wherein the sensor system includes a first generator control unit (GCU) and a second GCU, each with input lines which connect each GCU to a respective one of the first and second generators and a respective one of the first and second AC buses, wherein each GCU is operatively connected to directly receive sensor input and wherein each GCU is operatively connected to the AETC controller to directly provide the sensor input to the AETC controller for controlling the AETC, further comprising a ram air turbine (RAT) line contactor connecting between the AETC and the AC essential bus to selectively connect a RAT to the AC essential bus, wherein the AETC controller is operatively connected to the RAT line contactor to connect the RAT to the AC essential bus based on at least one of delta current and overcurrent in the AC essential bus and/or in the first and second AC buses.

2. The system as recited in claim 1, wherein the AETC controller is configured to switch the AETC between the second state and the first state based on input from the sensor system.

3. The system as recited in claim 2, wherein the AETC controller is configured to use the first AC bus as a preferred bus for powering the AC essential bus so the AETC is in the first state by default until there is a delta current and/or over current in one or more of the AC essential bus and/or the first AC bus.

4. The system as recited in claim 1 wherein the AETC includes a multi-phase or single phase, single pole, double throw contactor.

5. The system as recited in claim 1, wherein the AETC includes a multi-pole multi-throw contactor, and wherein at least one additional AC bus is connected to the AETC.

6. The system as recited in claim 5, wherein the at least one additional AC bus includes a third AC bus connected to a power source.

7. The system as recited in claim 5, wherein the at least one additional AC bus includes a third AC bus connected to a non-generator power source.

8. The system as recited in claim 1, further comprising:
a first contactor that is connected isolate the first AC bus from a power source; and
a second contactor that is connected to isolate the second AC bus from a power source.

9. The system as recited in claim 8, further comprising a third contactor connecting directly between the first and second AC buses for selectively isolating the first and second AC buses from each other.

10. The system as recited in claim 8, further comprising:
a first power source selectively connected to the first AC bus by the first contactor; and
a second power source selectively connected to the second AC bus by the second contactor.

11. A method of distributing power comprising:
supplying power from a first AC bus to an AC essential bus through an AC essential bus tie contactor (AETC);
detecting at least one of delta current and/or overcurrent in the AC essential bus;
switching the AETC to disconnect the AC essential bus from the first AC bus and to connect the AC essential bus to a second AC bus wherein switching includes using a first generator control unit (GCU) and a second GCU, each with input lines which connect each GCU to a respective one of first and second generators and a respective one of the first and second AC buses, wherein each GCU is operatively connected to directly receive sensor input and wherein each GCU is operatively connected to an AETC controller to directly provide the sensor input to the AETC controller for controlling the switching of the AETC, further comprising:
detecting at least one of delta current and/or overcurrent in the second AC bus;
switching a contactor to isolate the AC essential bus from the second AC bus; and
refraining from deploying a ram air turbine (RAT) with delta current and/or over current in the AC essential bus, further comprising keeping the AC essential bus connected to the first AC bus as a preferred bus whenever there is not a delta current or over current detected in the first AC bus.

* * * * *